United States Patent [19]

Roberts

[11] 4,132,546

[45] Jan. 2, 1979

[54] SMELTING OF IRON ORE WITH PARTIALLY DRIED LIGNITE

[76] Inventor: Edward S. Roberts, 214-05 33rd Ave., Bayside, Queens, N.Y. 11316

[21] Appl. No.: 855,974

[22] Filed: Nov. 30, 1977

[51] Int. Cl.² ............................................. C21B 5/00
[52] U.S. Cl. ...................................................... 75/42
[58] Field of Search ....................... 75/41, 42; 44/10 J

[56] References Cited

U.S. PATENT DOCUMENTS

| 1,565,689 | 12/1925 | Van Slyke | 75/41 |
| 1,577,902 | 3/1926 | Fernholtz | 44/10 J |
| 2,593,257 | 4/1952 | Bradley et al. | 75/42 |

Primary Examiner—M. J. Andrews

[57] ABSTRACT

Improved production of pig iron is effected with lump lignite or sub-bituminous coal that have been heated in hot water or steam under elevated pressure sufficient so that water does not change into steam. High moisture content lignite and sub-bituminous coal, which normally cannot be used in blast furnaces because of slacking, are partially dried by this treatment. For example, lumps of lignite or sub-bituminous coal with moisture contents of 30% to over 50%, have the moisture content reduced to from about 15% to 25% by this treatment and shrink in size and become much harder so that they do not slack and can be used in conventional lump size in blast furnaces. The temperature of heating with water or steam is preferably about 210° C to 218° C. The blast furnace is preferably operated with oxygen and steam though preheated air may be used.

5 Claims, 1 Drawing Figure

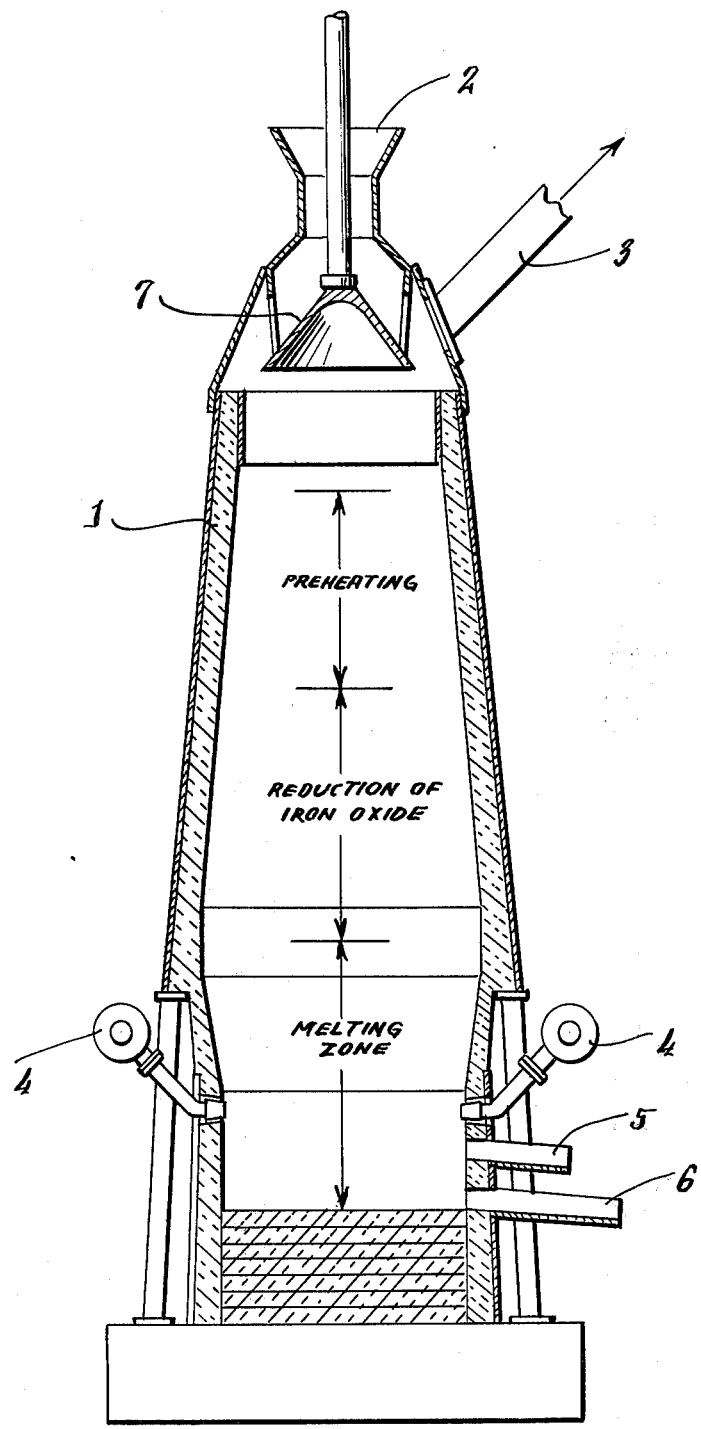

SMELTING OF IRON ORE WITH PARTIALLY DRIED LIGNITE

BACKGROUND OF THE INVENTION

Lignite having high moisture content has been treated by immersion in steam or hot water under pressure and had its moisture content reduced to from 16% to 20%. Lignite so treated does not slack, but has never been used in blast furnaces to produce pig iron, it has only been used in a single water gas plant in Europe.

SUMMARY OF THE INVENTION

Surprisingly, it has been found that lignite or sub-bituminous coal when partially dried to about 16% to 20% moisture by treatment in hot water under pressure not only does not slack but is sufficiently strong to be used in a blast furnace to produce pig iron. The cost of the partially dried lignite or sub-bituminous coal is very much less than coke, which is at present used in blast furnaces, and opens up a large field, particularly in localities where there is high moisture lignite or sub-bituminous coal but where there is no coking coal near at hand. Even when coking coal is available, the cost of making coke greatly exceeds the cost of partially dried lignite or sub-bituminous coal. In spite of the fact that partially dried lignite has a lower heating value and reducing value than coke and so somewhat more is required in a blast furnace, the cost is so much less that marked savings result.

While the present invention can be used in blast furnaces where the blast is preheated air, and of course as a result low heating value blast furnace gas is produced just as in the conventional blast furnace operation with coke, it is preferable to use the more modern blast furnace operation technique in which instead of air, oxygen enriched air, or, oxygen and steam are employed. When used with coke, as has been increasingly the case with new plants, blast furnace gas of higher heating value is produced. When the treated lignite or sub-bituminous coal of the present invention is used in the more modern process, valuable off-gas containing large amounts of carbon monoxide and hydrogen in any desired amounts can be produced concurrently with pig iron very economically.

If oxygen enriched air in proper proportions is used with steam as a temperature moderator the resulting off-gas can be put through a shift reaction to convert carbon monoxide to hydrogen and carbon dioxide. Then purified and a three to one mixture of hydrogen to nitrogen obtained suitable for ammonia synthesis. Using oxygen and steam any desired mixture of carbon monoxide and hydrogen desired for methanol of Fischer-Tropsch synthesis can be produced, or, pure hydrogen can be produced which can be combined with nitrogen from the oxygen plant for ammonia production.

Since lignites and sub-bituminous coals are the lowest cost fuels available they are suitable raw materials for gasification to produce hydrogen and hydrogen carbon monoxide mixtures or other feeds for chemical industry. The present invention allows such gasification to be combined with pig iron production in a wide variety of ratios of production.

As a result, the use of oxygen and steam procedure is preferred in the present invention though in its broader aspects it is not limited thereto.

In general the treatment with hot water or steam is effected at temperatures of at least about 186° C. Best results are obtained at somewhat higher temperatures, from about 200° C. to 218° C. or higher and at pressures from 15 atm. abs. to 28 atm. abs. This is usually more economical because the heating time becomes much less and the cost of the higher temperature steam or water is but little more than that at the minimum temperature, and there is a considerable saving in time. The removal of water from the lignite requires from about 460 to 540 kilogram calories per kilogram of water removed. Shrinkage of the lignite is about 20% but, of course, will vary somewhat with the particular material treated.

Reference has been made to the preference of using the modern blast furnace technique with oxygen and steam instead of air. Where there is a demand for hydrogen or hydrogen-carbon monoxide mixtures that are low in nitrogen and the demand is more than that which would be produced by the blast furnace producing a given amount of pig iron, it is possible to increase the amount of high grade off-gas by loading the blast furnace with an excess of partially dried and hardened lignite or sub-bituminous coal and increasing the amount of steam and oxygen. This permits the blast furnace to operate to produce two desirable results with the same size equipment, that is to say, pig iron and salable excess high grade blast furnace gas. The very low cost of partially dried lignite or sub-bituminous coal, particularly as compared to coke, makes the modification using excess lignite an attractive one. Of course, for optimum return there is a limit to the amount of excess partially dried lignite which can be accommodated in a blast furnace, but to the extent that the blast furnace has capacity for producing high grade blast furnace gas from the excess lignite this is often a desirable economic combination. However, when air is not used the volume of gas that must rise through the charge is much less therefore the capacity of a furnace of a given diameter is increased.

It should be understood that while the basic feature of the present invention is blast furnace operation and production of pig iron using specially treated dried lignite or sub-bituminous coal, it is not essential that all of the carbon source be the partially dried lignite or sub-bituminous coal. It is perfectly possible to use a mixture of lignite and coke. Ordinarily this is less economical because of the large differential in price between lignite and coke, but the fact that such mixtures can be used is included with the scope of the present invention.

BRIEF DESCRIPTION OF THE DRAWING

The drawing is a diagrammatic illustration of a modern blast furnace which is suitable for use with the present invention.

DESCRIPTION OF THE PREFERRED EMBODIMENTS

In the drawing the blast furnace is shown at (1) with a solid intake at (2) for the solids, including the lumps of treated, dried and shrunk lignite, lime or limestone and other slag or fluxing solids. It is customary to have a rotary distributor, which is shown at (7). Off-gas outlet is at (3), and after the solids are introduced they slowly pass down through the blast furnace through the three zones, shown by legends. Preheated air or other oxygen-containing gas is introduced under pressure through the tuyeres (4) and passes up through the blast furnace, burning a small portion of the lignite and gasifying the remainder for heating and reducing the iron ore and finally passing off as an off-gas from the top of the blast furnace at (3).

Preferably, if a high value off-gas is desired, a mixture of commercial oxygen and steam is introduced through the tuyeres and there performs the same function but produces off-gas with lower nitrogen content as the gases pass up through the charge where the oxygen reacts with carbon to form carbon monoxide which reacts with the iron oxide to produce carbon dioxide which in turn react with more carbon to form carbon monoxide; and water vapor introduced with oxygen, or formed by reaction of hydrogen with oxygen, reacts with carbon to form carbon monoxide and hydrogen. After leaving the melting zone, the molten pig iron and slag flow down into the hearth where the pig iron sinks to the bottom and the slag floats on top, and, periodically, slag is removed through the slag tap (5) and, finally, pig iron is tapped off through the pig iron tap (6).

The general procedure in the blast furnace is not greatly different from that in an ordinary blast furnace, the new features of the invention residing in the use of treated partially dried lignite or sub-bituminous coal instead of coke. Since the blast furnace is not essentially different in its structure from modern blast furnaces, it is shown purely diagrammatically, and auxiliaries, such as blowers to produce draft, heat exchangers or air preheating stoves, and the like are not shown as these are not essentially changed by the present invention and perform exactly the same function as they do in an ordinary blast furnace. Other structural features, such as insulation of the blast furnace walls to conserve heat, and other structural features which are not changed by the present invention are also not illustrated.

Since it is economically feasible to produce gas from the treated lignite, the gas produced when using oxygen and steam instead of air will be low in nitrogen and high in valuable hydrogen and carbon monoxide. This is not to say that the present invention cannot be used with heated air as is used in most blast furnaces but since the higher value of the off-gas which can be produced by oxygen and steam represents an additional saving or cost offset, this modification is very definitely preferred.

Lignites and sub-bituminous coals vary greatly not only in their moisture content but also in their chemical composition, and it is an advantage of the present invention that when these fuels are treated to reduce the moisture content this is applicable to a wide number of such lower grade fuels. The invention, therefore, not limited to one particular kind of lignite or sub-bituminous coal and has a broad use with a wide choice of low cost fuels.

EXAMPLE

All ton weights are metric tons. Pellets of iron ore concentrates weighing 7230 tons per day containing 65% Fe in $Fe_2O_3$ and 7.07% gangue composed mainly of $SiO_2$, are to be used with 11546 tons per day of raw lump lignite to produce 5,000 tons per day of pig iron containing 5.26% C and 0.77% Si, concurrently with the production of a gas mixture low in $N_2$ and containing 410900 kg moles per day of CO + $H_2$. The 11546 tons of raw lignite contain 36.8% moisture and 5.9% ash of which 0.75% is considered as CaO and 5.15% as $SiO_2$. On a moisture free basis the C, H, N, S, O and ash contents are:

| | |
|---|---|
| C | 64.3% |
| H | 4.5% |
| N | 1.0% |
| S | 1.4% |
| O | 19.4% |
| ash | 9.4% |
| | 100.0% |

On a moisture free basis the H.H.V. of the lignite is 6156 kcal/kg. A load of 321 tons of raw lump lignite is filled into one of 5 autoclaves each of 555 steres capacity. After closing the autoclave it is purged of air by steam blown down from another autoclave. The first autoclave is then filled with hot water blown out of another autoclave that has finished its heating period. Then the filled first autoclave is heated to 220° C by steam taken from a boiler operating at 24 kg/cm² abs. and the steam may be either saturated or superheated. The heating period lasts for 1-⅜ hrs. during which time $2.328 \times 10^6$ kg of steam saturated at 24 kg/cm² abs. pressure is added which is sufficiently high so that the lignite is in contact with liquid water and the water does not vaporize. At the termination of the heating, the hot water is blown out and into another autoclave that has just been filled with lignite and purged of air. After the hot water is blown out, the remaining steam is blown out and into another autoclave that has just been filled with raw lignite and closed in order to purge out the air. The 8900 tons per day of autoclaved lignite, when removed from the autoclave, has a moisture content of about 18% and the lumps have shrunken in size and have hardened, and are ready to feed into the top of the blast furnace along with the iron pellets and the 1245 tons per day of lime needed for slagging and desulfurization.

Into the tuyeres at the base of the blast furnace 3110 kg/min. of $O_2$ is introduced mixed with 1200 kg/min. of steam. This produces a temperature at the tuyeres level of and 1800° C and metallic iron that is formed higher in the furnace is melted and flows down to the hearth with the slag that is also formed. The reducing conditions are such that C and Si are added to the molten iron. As the gases rise through the charge, first FeO is reduced to Fe and then, higher up, and at lower temperatures, $Fe_2O_3$ is reduced to FeO. Also as the gases rise some of the $CO_2$ that has formed and $H_2O$ react with carbon in the lignite are are reduced. The gases leaving the top of the blast furnace at about 375° C have approximately the following composition:

| | |
|---|---|
| $N_2$ | 0.4% |
| $H_2$ | 23.2% |
| $H_2O$ | 24.8% |
| CO | 33.5% |
| $CO_2$ | 18.1% |
| | 100.0% | and the quantity of CO + $H_2$ is 410,900 kg moles per day which, after the conversion of the CO to $H_2$ and $CO_2$ removal, is enough $H_2$ to produce 4200 tons of $NH_3$ at a 90% yield, when combined with $N_2$ from the $O_2$ plant. This production is about a tenth of the $NH_3$ production of the U.S. whereas the 5000 tons of pig iron is less than a fiftieth of the U.S. production of pig iron and the market value of the 4200 tons of ammonia produced would be about 65% of that of the 5000 tons of pig iron produced.

I claim:

1. A method of producing pig iron by the blast furnace procedure which comprises introducing iron ore, slagging material, and partially dried lignite or sub-bituminous coal by subjecting the lignite or coal to the action of liquid hot water near the boiling point of water and under sufficient pressure so that the water does not vaporize into steam, whereby the lignite or coal is shrunken to the degree that its strength is adequate for blast furnace operation, and introducing a blast of oxygen containing gas in the bottom of the blast furnace.

2. A process of producing pig iron by the blast furnace process according to claim 1 in which the blast of oxidizing gas for the blast furnace is a mixture of oxygen and steam.

3. A process according to claim 2 in which the lignite or sub-bituminous coal is used in excess of that theoretically required to reduce the iron whereby additional high heating value blast furnace gas is produced in the same equipment.

4. A process according to claim 1 in which the lignite or sub-bituminous coal has been dried by autoclaving with hot water or steam under pressure to a moisture content not substantially in excess of 20%.

5. A process according to claim 2 in which the lignite or sub-bituminous coal has been dried by autoclaving with hot water or steam under pressure to a moisture content not substantially in excess of 20%.

* * * * *